(12) United States Patent
Hsieh et al.

(10) Patent No.: US 8,421,974 B2
(45) Date of Patent: Apr. 16, 2013

(54) PIXEL STRUCTURE, LIQUID CRYSTAL DISPLAY STRUCTURE AND METHODS FOR FORMING THE SAME

(75) Inventors: Chih Yung Hsieh, Tainan County (TW); Chien Hong Chen, Tainan County (TW)

(73) Assignee: Chimei Innolux Corporation, Chu-Nan (TW)

( * ) Notice: Subject to any disclaimer, the term of this patent is extended or adjusted under 35 U.S.C. 154(b) by 803 days.

(21) Appl. No.: 12/006,014

(22) Filed: Dec. 28, 2007

(65) Prior Publication Data
US 2008/0158456 A1    Jul. 3, 2008

(30) Foreign Application Priority Data
Dec. 29, 2006  (TW) .............................. 95150048 A

(51) Int. Cl.
*G02F 1/1343*   (2006.01)
(52) U.S. Cl.
USPC ........... 349/141; 349/129; 349/139; 349/114; 349/43; 349/38; 349/187; 438/30
(58) Field of Classification Search ........................ None
See application file for complete search history.

(56) References Cited

U.S. PATENT DOCUMENTS

| | | | |
|---|---|---|---|
| 6,515,728 B1 * | 2/2003 | Song et al. | 349/148 |
| 6,671,025 B1 * | 12/2003 | Ikeda et al. | 349/156 |
| 2002/0159016 A1 * | 10/2002 | Nishida et al. | 349/141 |
| 2003/0095223 A1 * | 5/2003 | Song | 349/141 |
| 2003/0164916 A1 * | 9/2003 | Chien et al. | 349/129 |
| 2004/0135147 A1 | 7/2004 | Kim et al. | |
| 2005/0036091 A1 * | 2/2005 | Song | 349/129 |
| 2006/0023137 A1 * | 2/2006 | Kamada et al. | 349/44 |
| 2007/0177067 A1 | 8/2007 | Kim et al. | |

FOREIGN PATENT DOCUMENTS

| | | |
|---|---|---|
| CN | 1764865 | 4/2006 |
| TW | 200529440 | 9/2005 |
| TW | 200630719 | 9/2006 |

* cited by examiner

*Primary Examiner* — Brian Healy
*Assistant Examiner* — Andrew Jordan
(74) *Attorney, Agent, or Firm* — Liu & Liu

(57) ABSTRACT

A pixel structure includes a first pixel electrode and a second pixel electrode. The second pixel electrode is configured around the first pixel electrode. The first pixel electrode is coupled to a first voltage and the second pixel electrode is coupled to a second voltage. The second voltage is higher than the first voltage. The area of the first pixel electrode is larger than that of the second pixel electrode.

17 Claims, 9 Drawing Sheets
(1 of 9 Drawing Sheet(s) Filed in Color)

PIXEL STRUCTURE, LIQUID CRYSTAL DISPLAY STRUCTURE AND METHODS FOR FORMING THE SAME

This application claims the benefit of Taiwan application Serial No. 95150048, filed Dec. 29, 2006, the subject matter of which is incorporated herein by reference.

BACKGROUND OF THE INVENTION

1. Field of the Invention

The invention relates in general to a pixel structure and a liquid crystal display (LCD) panel and an LCD device using the same, and more particularly to a pixel structure and an LCD panel and LCD device using the same capable of reducing color shift.

2. Description of the Related Art

A conventional multi-domain vertical alignment (MVA) liquid crystal display (LCD) device displays a frame. Color shift may occur and make the viewer feel the colors of an image different when the image is viewed from different view angles. The reason causing color shift is that the liquid crystal has a fixed tilting angle. The transmittance of the light differs at various view angles (a contained angle with the normal line of the panel), changing the mixing proportion of the light passing through the color filter.

To reduce color shift, a single pixel structure is divided into two independent pixel electrodes which are coupled to different voltages. FIG. 1 is a diagram of a conventional pixel structure. A pixel structure 10 is surrounded by two data lines 1 and two scan lines 2. A storage capacitor 3 is divided into a pixel electrode 4a and a pixel electrode 4b, which are coupled to a higher voltage and a lower voltage, respectively. The voltage differential between the pixel electrodes 4a and 4b results in liquid crystal molecules to tilt with different angles. The light emission rates of the liquid crystal molecules at different view angles are approximately the same. Accordingly, color shift is reduced. However, the pixel structures 10 are regally distributed in a panel. A viewer may see dark and bright grids when voltage differential results in different light emission rates.

Therefore, a chevron pixel structure is provided. FIG. 2 is a diagram of a conventional chevron pixel structure. A pixel structure 20 includes a pixel electrode 11 coupled to a low voltage and a pixel electrode 12 coupled to a higher voltage. The electrode 11 and the pixel electrode 12 are separated by a slit 13. A storage capacitor 14 disposed at the central part of the pixel structure 20 is coupled to the pixel electrodes 11 and 12 via the contacts 14a and 14b for stabilizing the voltages of the pixel electrodes 11 and 12, respectively. Protrusions 15a and 15b disposed over the substrate wind through the central part of the pixel electrode 11 and the pixel electrode 12, respectively. As the pixel electrode 11 and the pixel electrode 12 are not regularly disposed as the pixel electrodes 4a and 4b shown in FIG. 1. An LCD panel with the pixel structure 20 provides uniform brightness to a viewer. In order to enhance contrast, the area of the pixel electrode 11 providing a low voltage is larger than that of the pixel electrode 12 providing a high voltage and a ratio is approximately 2:1.

The pixel structure 20 and protrusions 15a and 15b are separately depicted in FIGS. 7A and 7B. Specifically, FIG. 7A is a schematic diagram of the pixel electrodes 11 and 12 over a second substrate of the pixel structure depicted in FIG. 2, and FIG. 7B is a schematic diagram of the protrusions over a first substrate of the pixel structure depicted in FIG. 2.

However, the slit 13 and the protrusions 15a and 15b of the pixel structure 20 at bright mode will affect the aperture ratio and reduce brightness. Furthermore, the protrusions 15a and 15b at dark mode may tilt down the liquid crystal molecules and result in light leakage, further affecting image contrast.

SUMMARY OF THE INVENTION

The invention is directed to a pixel structure and a liquid crystal display (LCD) panel and an LCD device using the same. By configuring the exemplary pixel structures as set forth below, the aperture ratio of the pixel structure can be desirably achieved, and brightness and contrast can be desirably enhanced.

According to an exemplary embodiment of the present invention, a pixel structure includes a first pixel electrode and a second pixel electrode. The second pixel electrode is configured around the first pixel electrode. The first pixel electrode is coupled to a first voltage and the second pixel electrode is coupled to a second voltage. The second voltage is higher than the first voltage. The area of the first pixel electrode is larger than that of the second pixel electrode.

According to an exemplary embodiment of the present invention, the first pixel electrode and the second pixel electrode are separated by a slit and the slit is around the first pixel electrode.

According to an exemplary embodiment of the present invention, the pixel structure further includes a first thin film transistor (TFT) coupled to the first pixel electrode and a second TFT coupled to the second pixel electrode.

According to an exemplary embodiment of the present invention, the pixel structure further includes at least one protrusion, wherein the at least one protrusion overlies at least one a portion of a first contact coupled to the first TFT and a portion of a second contact coupled to the second TFT.

According to an exemplary embodiment of the present invention, a ratio of the area of the first pixel electrode to the area of the second pixel electrode is about 2:1.

According to an exemplary embodiment of the present invention, the pixel structure further includes a storage capacitor coupled to at least one of the first pixel electrode and the second pixel electrode.

According to an exemplary embodiment of the present invention, a liquid crystal display (LCD) structure includes a first substrate. A second substrate includes a plurality of pixel structures, wherein each of the pixel structures comprises a first pixel electrode and a second pixel electrode, the second pixel electrode is configured around the first pixel electrode, the first pixel electrode is coupled to a first voltage and the second pixel electrode is coupled to a second voltage, the second voltage is higher than the first voltage, and the area of the first pixel electrode is larger than that of the second pixel electrode. A liquid crystal layer is disposed between the first substrate and the second substrate.

According to an exemplary embodiment of the present invention, a method for forming a LCD apparatus includes providing a first substrate. A plurality of pixel structures are formed over a second substrate, wherein each of the pixel structures comprises a first pixel electrode and a second pixel electrode, the second pixel electrode is configured around the first pixel electrode, the first pixel electrode is coupled to a first voltage and the second pixel electrode is coupled to a second voltage, the second voltage is higher than the first voltage, and the area of the first pixel electrode is larger than that of the second pixel electrode. A liquid crystal layer is formed over the second substrate and under the first substrate.

The invention will become apparent from the following detailed description of the preferred but non-limiting embodiments. The following description is made with reference to the accompanying drawings.

BRIEF DESCRIPTION OF THE DRAWINGS

The patent or application file contains at least on drawing executed in color. Copies of this patent or patent application publication with color drawing(s) will be provided by the Office upon request and payment of the necessary fee.

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 3:
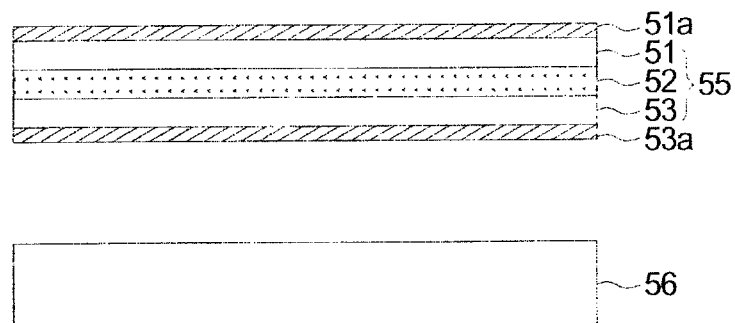
FIG. 3 is a schematic cross-sectional view of an LCD device.

FIG. 3 is a schematic cross-sectional view of an exemplary LCD device. In some embodiments, the LCD device 50 can include an LCD panel 55 and a backlight module 56. The LCD panel 55 can include a first substrate 51, a liquid crystal layer 52 and a second substrate 53. In some embodiments, the first substrate 51 can be referred to as a color filter substrate. The second substrate 53 can be referred to as a thin film transistor (TFT) substrate. In some embodiments, a first polarizing film 51a and a second polarizing film 53a can be adhered to the first substrate 51 and the second substrate 53, respectively. In some embodiments, the polarizing direction of the first polarizing film 51a can be substantially perpendicular to that of the second polarizing film 53a. In some embodiments, the backlight module 56 can be adjacent to the second substrate 53.

Figure 4:
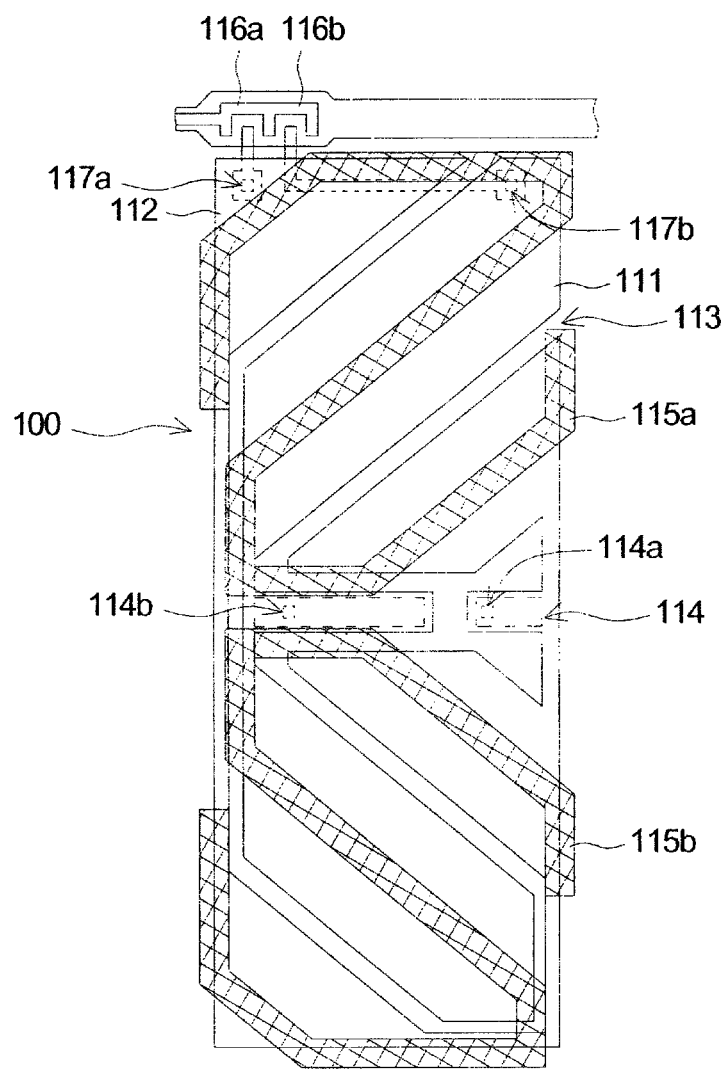
FIG. 4 is a schematic diagram of a chevron pixel structure of an exemplary embodiment of the invention.
Figure 5A:
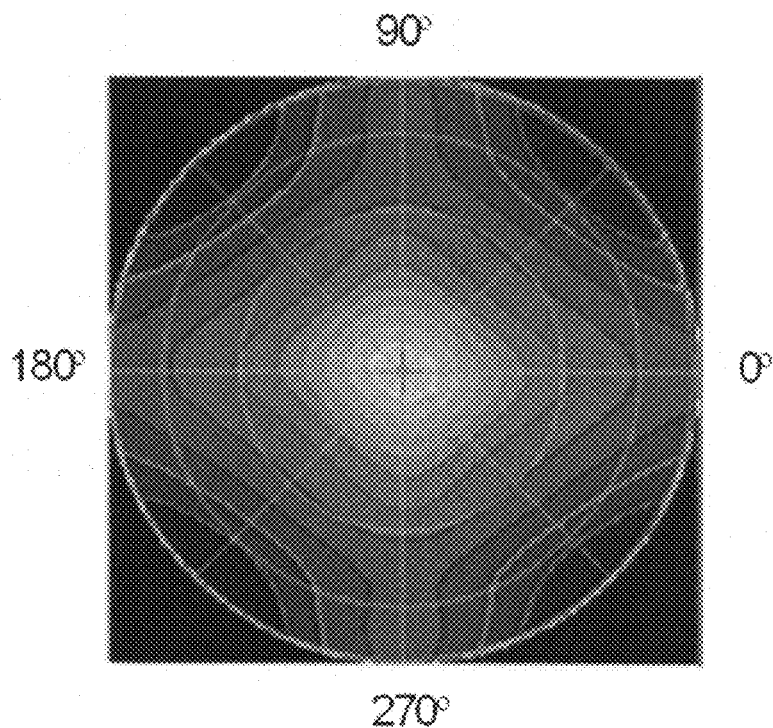
FIGS. 5A and 5B are drawings showing testing results of contrast of a conventional pixel structure and an exemplary pixel structure of the present invention.
Figure 5B:
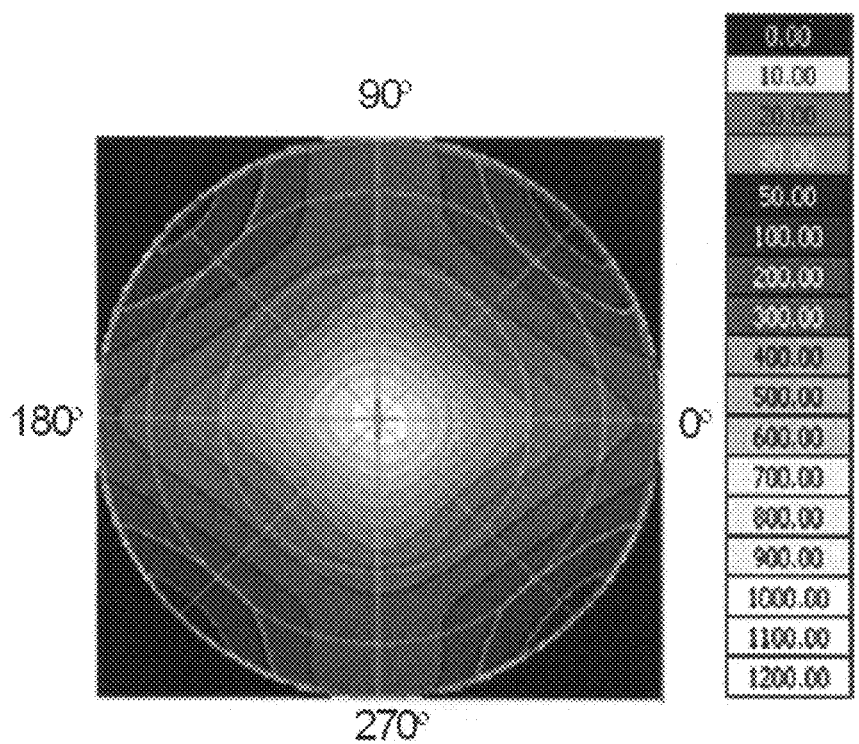

FIG. 4 is a schematic drawing showing an exemplary chevron pixel structure. The pixel structure 100 can be disposed over the second substrate 53 shown in FIG. 3. The pixel structure 100 can include a first pixel electrode 111 and a second pixel electrode 112. In some embodiments, the second pixel electrode 112 can be around the first pixel electrode 111. A first TFT 116a and a second TFT 116b can be respectively coupled to the second pixel electrode 112 and the first pixel electrode 111 through the contacts 117a and 117b. In some embodiments, the first pixel electrode 111 can be coupled to a first voltage and the second pixel electrode 112 can be coupled to a second voltage. The second voltage is higher than the first voltage. The area of the first pixel electrode 111 can be larger than that of the second pixel electrode 112. Referring again to FIG. 4, the first pixel electrode 111 is coupled to a low voltage. The second pixel electrode 112 is configured around the first pixel electrode 111 and coupled to a high voltage without substantially changing the ratio of the area of the first pixel electrode 111 to the area of the second pixel electrode 112. In some embodiments, the ratio of the area of the first pixel electrode 111 to the area of the second pixel electrode 112 can be about 2:1. In some embodiments, the storage capacitor 114 can be coupled to at least one of the second pixel electrode 112 and the first pixel electrode 111 via the contacts 114a and 114b, respectively.

Figure 1:
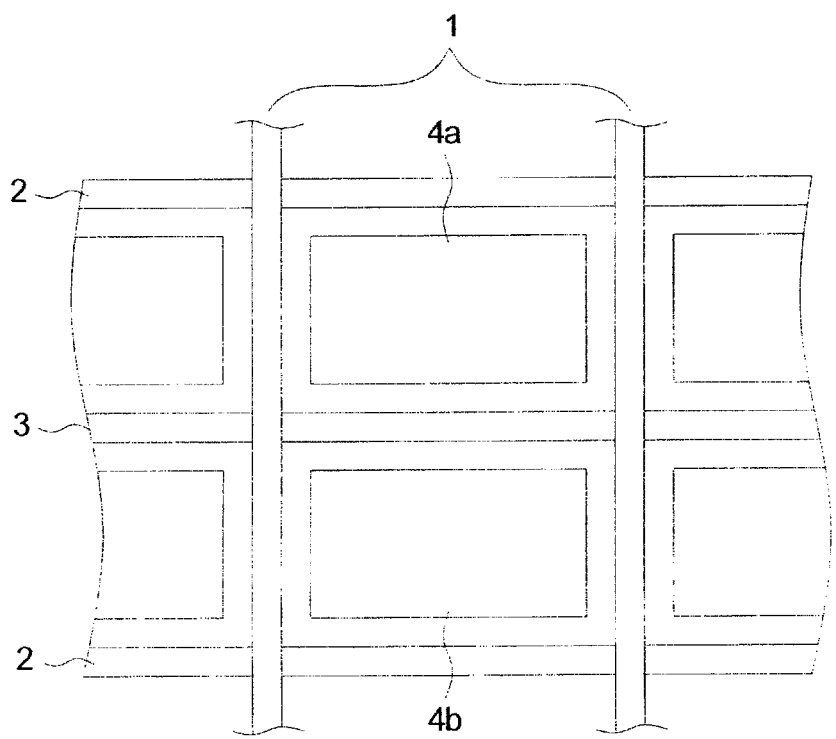
FIG. 1 is a diagram of a conventional pixel structure.
Figure 2:
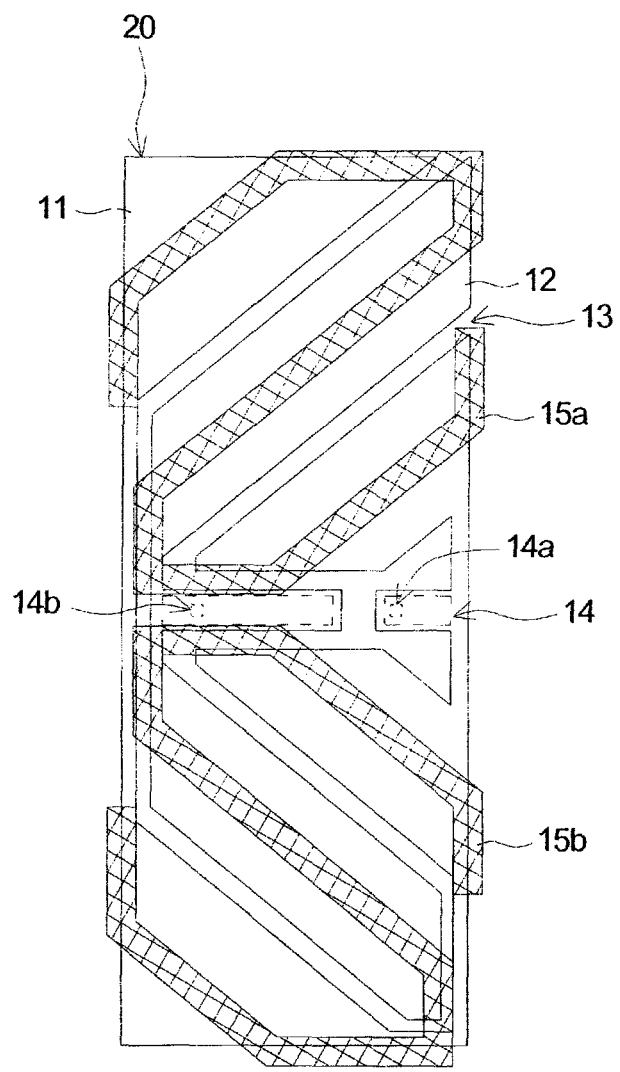
FIG. 2 is a diagram of a conventional chevron pixel structure.

In some embodiments, the first pixel electrode 111 and the second pixel electrode 112 can be separated by a slit 113. In order to substantially uniformly tilt liquid crystal molecules in various direction, protrusions 115a and 115b can be disposed over the first substrate 51 of FIG. 3. Each of the protrusions 115a and 115b can extend from a first edge of the second pixel electrode, to a second edge of the second pixel electrode, to a first corner of the first pixel electrode, to a second corner of the first pixel electrode, to a third edge of the second pixel electrode and to a fourth edge of the second pixel electrode. In some embodiments, the protrusions 115a and 115b can wind through the central part of the first pixel electrode 111 and the second pixel electrode 112 thereabove. In some embodiments for substantially maintaining the ratio of the area of the pixel electrodes, the slit 113 and the protrusions 115a and 115b can be substantially parallel extended away from the two long edges of the first pixel electrode 111. In some embodiments, the protrusions 115a and 115b are moved toward the left-upper corner and the left-lower corner of the second pixel electrode 112 shown in FIG. 4. The ratio of the area of the slit 113 and the protrusions 115a and 115b to the area of the pixel structure 100 can be decreased and the aperture ratio can be desirably increased. In some embodiments, the decrease of the area of the protrusions 115a and 115b can desirably enhance contrast and/or expand view angle. In some embodiments, the first substrate 51 can include at least one slit (not shown) winding atop the central part of the first pixel electrode 111 and the second pixel electrode 112 for uniformly allocating the tilting direction of the liquid crystal molecules. Compared with the conventional pixel structure, the pixel structure 100 show in the exemplary embodiments can have a slit smaller than that show in FIG. 2. The brightness and contrast of the display device can be desirably enhanced.

Figure 6A:
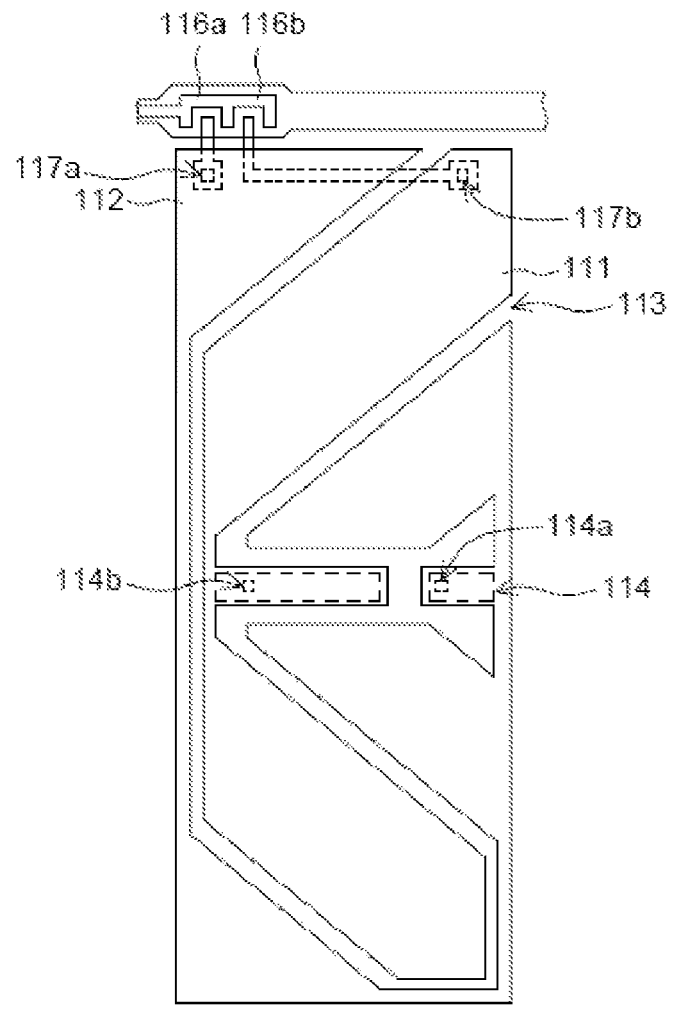
FIG. 6A is schematic diagram of the pixel electrodes over the second substrate of the pixel structure depicted in FIG. 4.
Figure 6B:
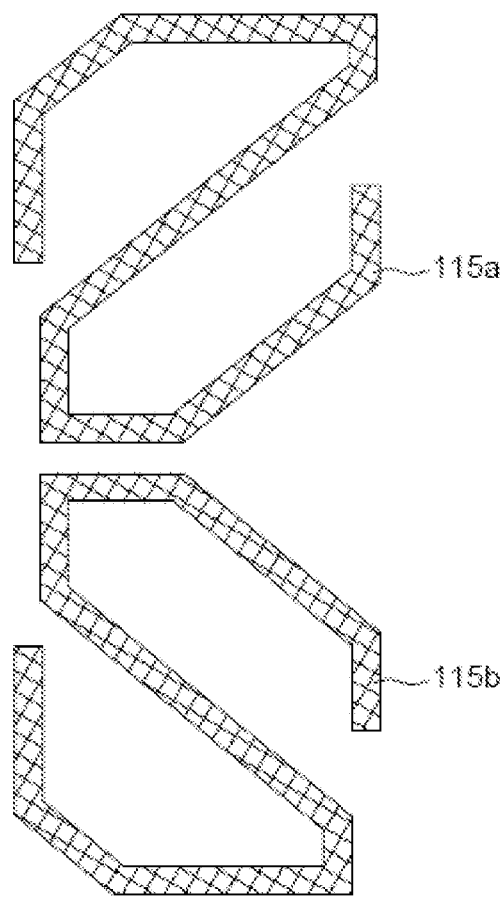
FIG. 6B is schematic diagram of the protrusions over the first substrate of the pixel structure depicted in FIG. 4.
Figure 7A:
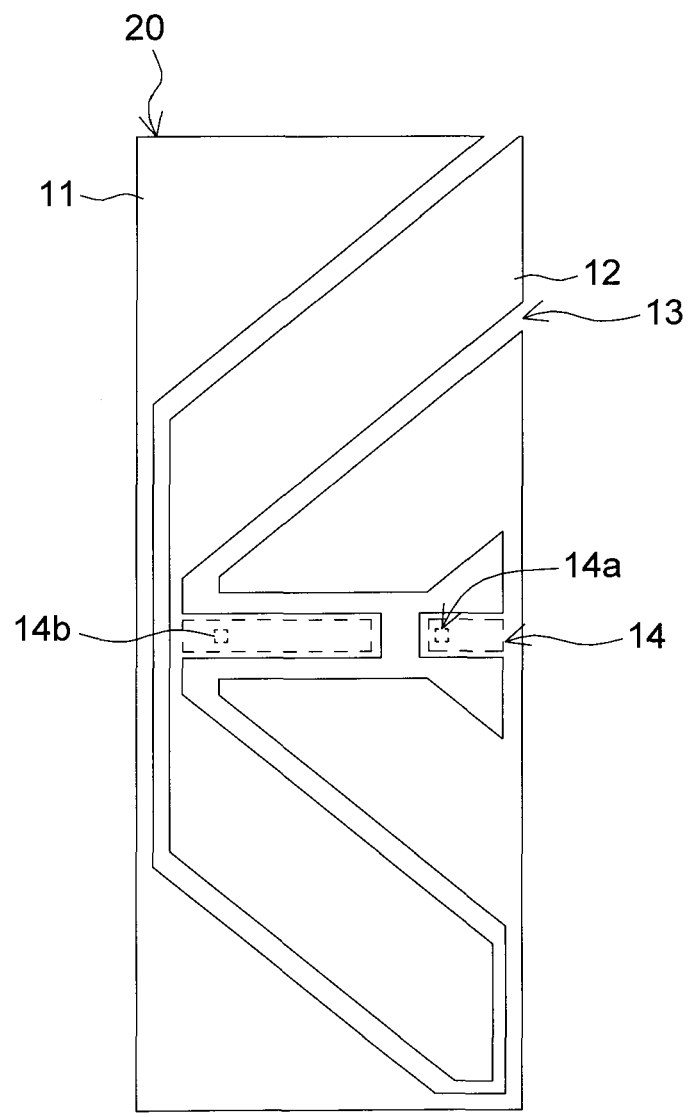
FIG. 7A is schematic diagram of the pixel electrodes over the second substrate of the pixel structure depicted in FIG. 2.
Figure 7B:
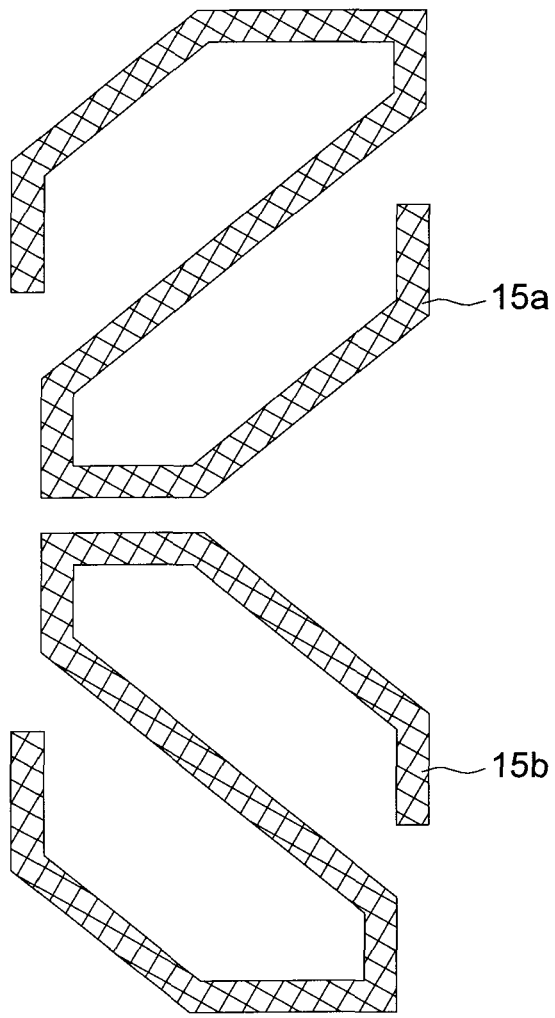
FIG. 7B is schematic diagram of the protrusions over the first substrate of the pixel structure depicted in FIG. 2.

The pixel structure 100 and protrusions 115a and 115b are separately depicted in FIGS. 6A and 6B. Specifically, FIG. 6A is a schematic diagram of the pixel electrodes 111 and 112 over the second substrate 53 of the pixel structure 100 depicted in FIG. 4, and FIG. 6B is a schematic diagram of the protrusions 115a and 115b over the first substrate 51 of the pixel structure depicted in FIG. 4. In FIG. 6A, it can be seen that the first pixel electrode 111 has a V-shaped structure having two extending portions defining a V-shaped space, and the second pixel electrode 112 has a portion disposed in the V-shaped space and another portion disposed outside the V-shaped structure.

Referring to the drawings 5A and 5B, testing results for the contrast of the display device adopting a conventional pixel structure and the display device of the invention are respectively shown. Let the minimum contrast threshold value for viewable angles be 10. According to the comparison of the two appended drawings, the contrast at the directional angle of 45 degrees, 135 degrees, 225 degrees, and 315 degrees is significantly improved in the display device adopting the pixel structure 100. Compared with the conventional pixel structure, the pixel structure 100 shown in FIG. 4 can desirably achieve a wider range of view angle.

According to the pixel structure and LCD panel and the LCD device using the same disclosed in the above embodiments of the invention, the high voltage pixel structure of the chevron pixel structure surrounds the low voltage pixel structure. Without substantially changing the ratio between the areas of the pixel structures, the original low color shift can be desirably maintained. As the slit and the protrusion only occupy a smaller area, the aperture ratio can be desirably increased, hence enhancing brightness. As the area of the protrusion is reduced, contrast is enhanced and view angle is widened.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pixel structure, comprising:
   a first pixel electrode comprising a V-shaped structure having two extending portions defining a V-shaped space; and
   a second pixel electrode comprising a portion disposed in the V-shaped space and another portion disposed outside the V-shaped structure, the first pixel electrode being coupled to a first voltage, the second pixel electrode coupled to a second voltage, the second voltage being higher than the first voltage, the area of the first pixel electrode being larger than that of the second pixel electrode,
   wherein a ratio of the area of the first pixel electrode to the area of the second pixel electrode is about 2:1, and wherein a portion of the first pixel electrode to which the first voltage of lower voltage is applied is located between two portions of the second pixel electrode to which the second voltage of higher voltage is applied.

2. The pixel structure according to claim 1, wherein the first pixel electrode and the second pixel electrode are separated by a slit and the slit is around the first pixel electrode.

3. The pixel structure according to claim 1, further comprising a first thin film transistor (TFT) coupled to the first pixel electrode and a second TFT coupled to the second pixel electrode.

4. The pixel structure according to claim 3, further comprising at least one protrusion extending, wherein the at least one protrusion overlies at least one a portion of a first contact coupled to the first TFT and a portion of a second contact coupled to the second TFT.

5. The pixel structure according to claim 4, further comprising a storage capacitor coupled to at least one of the first pixel electrode and the second pixel electrode.

6. A liquid crystal display (LCD) structure, comprising:
   a first substrate;
   a second substrate having a plurality of pixel structures, wherein each of the pixel structures comprises a first pixel electrode comprising a V-shaped structure having two extending portions defining a V-shaped space and a second pixel electrode comprising a portion disposed in the V-shaped space and another portion disposed outside the V-shaped structure, and wherein the first pixel electrode is coupled to a first voltage and the second pixel electrode is coupled to a second voltage, the second voltage is higher than the first voltage, and the area of the first pixel electrode is larger than that of the second pixel electrode; and
   a liquid crystal layer disposed between the first substrate and the second substrate,
   wherein a ratio of the area of the first pixel electrode to the area of the second pixel electrode is about 2:1, and wherein a portion of the first pixel electrode to which the first voltage of lower voltage is applied is located between two portions of the second pixel electrode to which the second voltage of higher voltage is applied.

7. The LCD structure according to claim 6, wherein the first pixel electrode and the second pixel electrode are separated by a slit and the slit is around the first pixel electrode.

8. The LCD structure according to claim 6, further comprising a first thin film transistor (TFT) coupled to the first pixel electrode and a second TFT coupled to the second pixel electrode.

9. The LCD structure according to claim 8, wherein each of the pixel structures further comprises at least one protrusion extending, and the at least one protrusion overlies at least one a portion of a first contact coupled to the first TFT and a portion of a second contact coupled to the second TFT.

10. The LCD structure according to claim 6, wherein each of the pixel structures further comprises a storage capacitor coupled to at least one of the first pixel electrode and the second pixel electrode.

11. The LCD structure according to claim 6, further comprising a first polarization film adjacent to the first substrate and a second polarization film adjacent to the second substrate.

12. The LCD structure according to claim 11, further comprising a backlight module, wherein the second polarization film is over the backlight module.

13. A method for forming a LCD apparatus, comprising:
    providing a first substrate;
    forming a plurality of pixel structures over a second substrate, wherein each of the pixel structures comprises a first pixel electrode comprising a V-shaped structure having two extending portions defining a V-shaped space and a second pixel electrode comprising a portion disposed in the V-shaped space and another portion disposed outside the V-shaped structure, and wherein the first pixel electrode is coupled to a first voltage and the second pixel electrode is coupled to a second voltage, the second voltage is higher than the first voltage, and the area of the first pixel electrode is larger than that of the second pixel electrode; and
    forming a liquid crystal layer over the second substrate and under the first substrate,
    wherein a ratio of the area of the first pixel electrode to the area of the second pixel electrode is about 2:1, and wherein a portion of the first pixel electrode to which the first voltage of lower voltage is applied is located between two portions of the second pixel electrode to which the second voltage of higher voltage is applied.

14. The method of claim 13, wherein forming the plurality of the pixel structures comprises forming a slit separating the first pixel electrode and the second pixel electrode, wherein the slit is around the first pixel electrode.

15. The method of claim 13, further comprising forming a first thin film transistor (TFT) coupled to the first pixel electrode and a second TFT coupled to the second pixel electrode.

16. The method of claim 15, wherein forming the plurality of the pixel structures comprises forming at least one protrusion, and the at least one protrusion overlies at least one a portion of a first contact coupled to the first TFT and a portion of a second contact coupled to the second TFT.

17. The method of claim 13, further comprising forming a storage capacitor coupled to at least one of the first pixel electrode and the second pixel electrode.

\* \* \* \* \*